United States Patent
Dvinov et al.

(10) Patent No.: US 11,397,736 B2
(45) Date of Patent: Jul. 26, 2022

(54) LARGE SCALE DATA INGESTION

(71) Applicant: salesforce.com, inc., San Francisco, CA (US)

(72) Inventors: Danil Dvinov, Oakland, CA (US); Michael Dandy, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 57 days.

(21) Appl. No.: 16/773,881

(22) Filed: Jan. 27, 2020

(65) Prior Publication Data

US 2021/0232585 A1 Jul. 29, 2021

(51) Int. Cl.
*G06F 16/2457* (2019.01)
*G06F 16/22* (2019.01)
*G06F 16/2452* (2019.01)
*G06F 16/28* (2019.01)
*G06F 16/2455* (2019.01)

(52) U.S. Cl.
CPC .. *G06F 16/24553* (2019.01); *G06F 16/24552* (2019.01); *G06F 16/284* (2019.01)

(58) Field of Classification Search
CPC ............. G06F 16/24553; G06F 16/284; G06F 16/24552
USPC .......................................................... 707/769
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Kuen S Lu
(74) *Attorney, Agent, or Firm* — Weaver Austin Villeneuve & Sampson LLP

(57) ABSTRACT

Disclosed are some implementations of systems, apparatus, methods and computer program products for performing data ingestion. A request received from a client device is processed, where the request has a payload including a plurality of data items pertaining to a data object. An identifier associated with the data object is generated. Information including the data items is obtained from the request. The information including the data items is stored in association with the identifier in a first data store, where the first data store is not a relational database. The data items and identifier are obtained from the first data store and stored in a second data store, where the second data store is a relational database. A query including the identifier is processed to obtain the identifier from the query. It is determined whether the identifier obtained from the query is in the first data store. One or more of the data items associated with the identifier are retrieved from the first data store according to a result of determining whether the identifier obtained from the query is in the first data store.

20 Claims, 11 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Eaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Eaven et al. |
| 8,447,754 B2 | 5/2013 | Weissman et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,782,605 B2 | 7/2014 | Dvinov et al. |
| 9,043,278 B1 * | 5/2015 | Wilson .................. G06F 16/27 707/626 |
| 9,098,365 B2 | 8/2015 | Smith et al. |
| 9,507,822 B2 | 11/2016 | Weissman et al. |
| 9,740,743 B2 | 8/2017 | Jagota et al. |
| 9,824,108 B2 | 11/2017 | Taylor et al. |
| 10,061,823 B2 | 8/2018 | Bruce et al. |
| 10,152,497 B2 | 12/2018 | Doan et al. |
| 10,162,851 B2 | 12/2018 | Eidson et al. |
| 10,235,476 B2 | 3/2019 | Vaishnav et al. |
| 10,237,336 B2 | 3/2019 | Dvinov et al. |
| 10,387,388 B2 | 8/2019 | Doan et al. |
| 10,496,640 B2 | 12/2019 | Taylor |
| 10,521,406 B2 | 12/2019 | Vaishnav et al. |
| 10,671,604 B2 | 6/2020 | Dvinov et al. |
| 10,733,613 B2 | 8/2020 | Vaishnav et al. |
| 10,901,996 B2 | 1/2021 | Doan et al. |
| 10,949,395 B2 | 3/2021 | Doan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |

(56) References Cited

U.S. PATENT DOCUMENTS

| | | |
|---|---|---|
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0299664 A1 | 11/2010 | Taylor et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0066672 A1 | 3/2012 | Smith et al. |
| 2012/0233137 A1 | 9/2012 | Jakobson et al. |
| 2012/0290407 A1 | 11/2012 | Hubbard et al. |
| 2012/0330931 A1* | 12/2012 | Nakano .............. G06F 16/2474 707/722 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246356 A1 | 9/2013 | Taylor et al. |
| 2013/0247216 A1 | 9/2013 | Cinarkaya et al. |
| 2014/0282392 A1* | 9/2014 | Shukla ................ G06F 9/45529 717/116 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2017/0116274 A1 | 4/2017 | Weissman et al. |
| 2017/0293629 A1 | 10/2017 | Doan et al. |
| 2018/0032562 A1 | 2/2018 | Taylor et al. |
| 2018/0075078 A1 | 3/2018 | Dandy et al. |
| 2018/0365299 A1 | 12/2018 | Bruce et al. |
| 2019/0384764 A1 | 12/2019 | Taylor |
| 2020/0210443 A1* | 7/2020 | Srinivasan ............ G06F 16/254 |
| 2020/0387568 A1* | 12/2020 | Carter .................. G06F 40/186 |
| 2021/0109941 A1 | 4/2021 | Lopez et al. |
| 2021/0192601 A1 | 6/2021 | Dandy et al. |
| 2021/0216591 A1 | 7/2021 | Dvinov et al. |

\* cited by examiner

500

```
{
    "Order":{
        "Account":"001B000000zTdYk",
        "EffectiveDate":"2019-12-11",
        "Status":"Draft",
        "TotalAmount":25.0,
        "Products":[
            {
                "Quantity":1,
                "ProductId":"01txx0000006opQAAQ",
                "Adjustments":[
                    {
                        "Name":"Summer Sale",
                        "Amount":-5.0,
                        "Taxes":[
                            {
                                "Name":"Summer Sale Tax",
                                "EffectiveDate":"2019-12-11",
                                "Type":"Actual",
                                "Amount":-0.50
                            }
                        ]
                    },
                    {
                        "Name":"First Time Customer",
                        "Amount":-2.0
                    }
                ],
                "Taxes":[
                    {
                        "Name":"Country Tax",
                        "EffectiveDate":"2019-12-11",
                        "Type":"Actual",
                        "Amount":0.80
                    }
                ]
            }
        ]
    }
}
```

| Order ID | Order Payload |
|----------|---------------|
| Order1   | Payload1      |
| Order2   | Payload2      |
| Order3   | Payload3      |
| ...      |               |
| OrderN   | PayloadN      |

| Order ID |
|----------|
| Order1   |
| Order2   |
| Order3   |
| ...      |
| OrderN   |

*FIGURE 6B*

LARGE SCALE DATA INGESTION

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with data ingestion. More specifically, this patent document discloses techniques for facilitating efficient access to data during data ingestion.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with online ordering systems, by way of example, in a cloud computing environment.

In systems such as online ordering systems, data ingestion is typically performed in real time. As orders are processed, electronic messages are typically transmitted to confirm receipt of the orders. These confirmation messages typically include order numbers that enable customers track their orders.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 5 shows a simplified example of an order 500 that may be processed, in accordance with some implementations.

FIG. 6A shows an example of a data structure 600 that may be used to store order information in a non-relational database, in accordance with some implementations.

FIG. 6B shows an example of a data structure 650 that may be used to store order identifiers in a cache, in accordance with some implementations.

DETAILED DESCRIPTION

Figure 1:
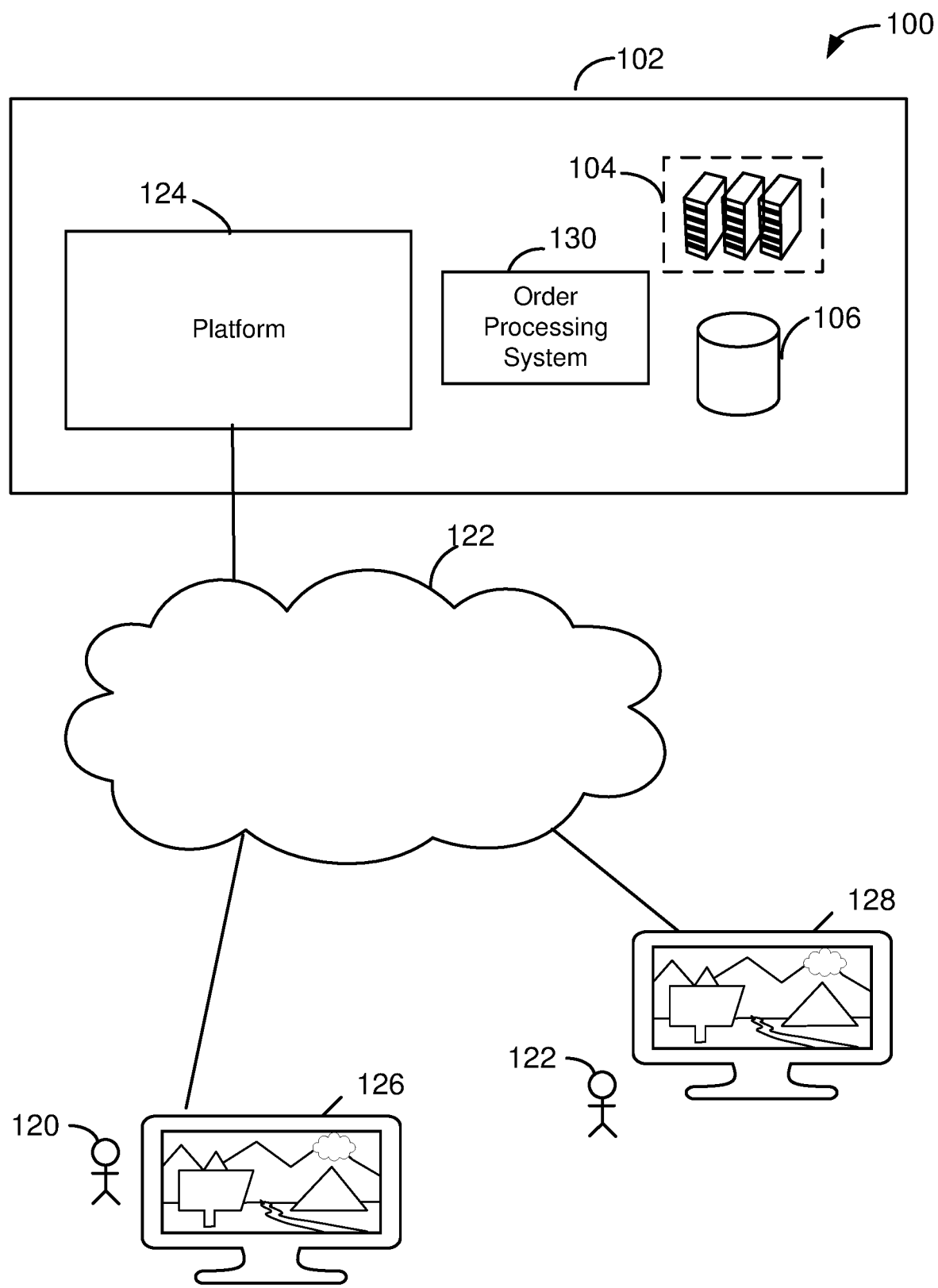
FIG. 1 shows a system diagram of an example of a system 100 in which data ingestion may be performed, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for facilitating access of data during data ingestion. In some implementations, techniques are disclosed for processing orders to enable orders to be accessed during data ingestion. These techniques facilitate the retrieval of an order before the ingestion of the order has been completed.

In some implementations, a request having a payload that includes a plurality of data items pertaining to a data object is received from a first client device. An identifier associated with the data object is generated and information including the data items is obtained from the request without parsing the request to obtain the individual data items. The information including the data items is stored in association with the identifier in a first data store, where the first data store is not a relational database. The data object may be queried in the first data store using the identifier while processing of the payload is completed.

In some implementations, a data object includes, represents or corresponds to an order. An order can include any number of data items that together define the order. The relationship among the data items may be represented via a variety of data models or data structures. Therefore, the payload may include any number of fields and data items in a variety of different formats.

To facilitate efficient access to the data object or associated data items, the system may store the payload in the first data store without further processing of the payload. This enables the data items of the payload to be accessed before processing of the payload is complete.

In some implementations, the data items and identifier are obtained from the first data store, and the obtained data items are stored in association with the identifier in a second data store, where the second data store is a relational database. Specifically, the payload may be parsed to obtain the individual data items and the individual data items may be stored in the relational database. The processing of the payload and storing of the data items in the relational database may be performed by a background process. By storing the individual data items in a relational database, the advantages of a relational database may be leveraged to provide efficient querying capabilities.

In some implementations, after the data items are stored in association with the identifier in the second data store, the data items and associated identifier may be deleted from the first data store. This deletion may be performed by a background process. The data items may then be accessed from the second data store by querying the identifier or other information in the second data store.

In some implementations, a customer or service agent submits a query that includes the identifier. For example, the query may be submitted via an application programming interface (API) via the first client device or a second client device. The query is processed to obtain the identifier from the query, and the identifier is used to access information pertaining to the data object. Specifically, it is determined whether the identifier obtained from the query is in the first data store. One or more of the data items associated with the identifier may be retrieved from the first data store according to a result of determining whether the identifier obtained from the query is in the first data store. More particularly, if the identifier is in the first data store, the data items may be retrieved from the first data store. However, if the identifier is not in the first data store, the data items may be retrieved from the second data store.

In some implementations, a cache is used by the system to determine whether to retrieve information associated with a data object from the first data store or the second data store. Specifically, after the information corresponding to the data object is stored in the first data store, the corresponding identifier is stored in the cache to indicate that information associated with the data object is stored in the first data store. Thus, the system may determine whether the identifier obtained from the query is in the first data store by ascertaining whether the identifier is in the cache. In this manner, the system may identify the data store from which information pertaining to the data object can be retrieved.

After the data items and identifier are stored in the second data store, the identifier may be deleted from the cache to indicate that the information associated with the data object (e.g., order) is now stored in the second data store. The deletion of identifiers from the cache may be performed by a background process.

During peak times, orders come in at a very fast rate and need to be ingested into a system. At times, a customer may submit an order and subsequently wish to modify or cancel the order. To provide a good customer experience, it is desirable to enable a customer or service agent to access a recently placed order. Unfortunately, creating an order in a complex system can be very resource intensive and a time-consuming process. Specifically, saving data for every order into a relational database can take a significant amount of time and consume a significant amount of central processing unit (CPU) resources. As a result, a significant amount of time can elapse between the time the customer places an order and the time it is available.

To solve these problems, order data is first saved to a first data store that is not a relational database, enabling data to be "written" more quickly than to a relational database. The order data can then be saved to a second data store that is a relational database. Upon receipt of a query including an order identifier, the system may access the order in the first data store until it is available in the second data store.

By way of illustration, John is a customer service employee at an organization, Acme Construction, Inc. Emily has submitted an order via Acme Construction's web site and realizes that she has submitted the wrong mailing address during the ordering process. Emily calls Acme Construction's customer service number and speaks with John.

Emily explains the error to John, who asks Emily for the order number. John accesses Acme's internal querying system and submits a query with the order number. The system determines whether the order number is in an order cache. If the order number is in the cache, the system queries a non-relational database to retrieve the order. However, if the order number is not in the cache, the system queries a relational database to retrieve the order.

In this case, the system determines that the order number is in the cache, retrieves the order from the non-relational database and provides the order for display via John's computer. John modifies the shipping address and the changed shipping address is saved to the non-relational database. The system subsequently saves the modified order to the relational database. After the order is saved to the relational database, the system deletes the order from the non-relational database and the order number from the cache.

FIG. 1 shows a system diagram of an example of a system 100 in which data ingestion may be performed, in accordance with some implementations. Database system 102 includes a variety of different hardware and/or software components that are in communication with each other. In the non-limiting example of FIG. 1, system 102 includes any number of computing devices such as servers 104, which may include one or more email servers. Servers 104 are in communication with one or more storage mediums 106 configured to store and maintain relevant metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store order information in databases, which may be generated, updated, and accessed as described in further detail below.

Storage mediums 106 can include a variety of data stores and/or caches, as will be described in further detail below.

In some implementations, system 102 is configured to store user profiles/user accounts associated with users of system 102. Information maintained in a user account (e.g., email account) of a user can include or indicate a user email address and credentials of the user. For example, credentials of the user can include a username and password. The information can also include order numbers of orders that have been submitted by the user.

Client devices 126, 128 may be in communication with system 102 via network 122. More particularly, client devices 126, 128 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at a web site such as Salesforce.com®. By logging into this account, the user can access the various services provided by servers 104, including an online ordering service and an order querying service, as will be described in further detail below.

In some implementations, users 120, 122 of client devices 126, 128 can access services provided by servers 104 by logging into system 102 via platform 124. More particularly, client devices 126, 128 can log into system 102 via an application programming interface (API) or via a graphical user interface (GUI) using credentials of corresponding users 120, 122, respectively.

User 120 can log into their account using client device 126 to submit an order via servers 104. User 122 can be a customer service employee of Salesforce that submits an order query via servers 104 using client device 128 in response to a phone inquiry by user 120. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, system 102 includes an Order Processing System 130 that facilitates processing of orders submitted to system 102. During processing of orders, order processing system 130 saves order information so that it can be accessed by a customer or customer service representative. Order processing system 130 can include a number of different components that store order information to facilitate efficient order retrieval, modification, or cancellation. Examples of implementations of order processing system 130 will be described in further detail below. Communication among components of system 102 may be facilitated through a combination of networks and interfaces.

Figure 2A:
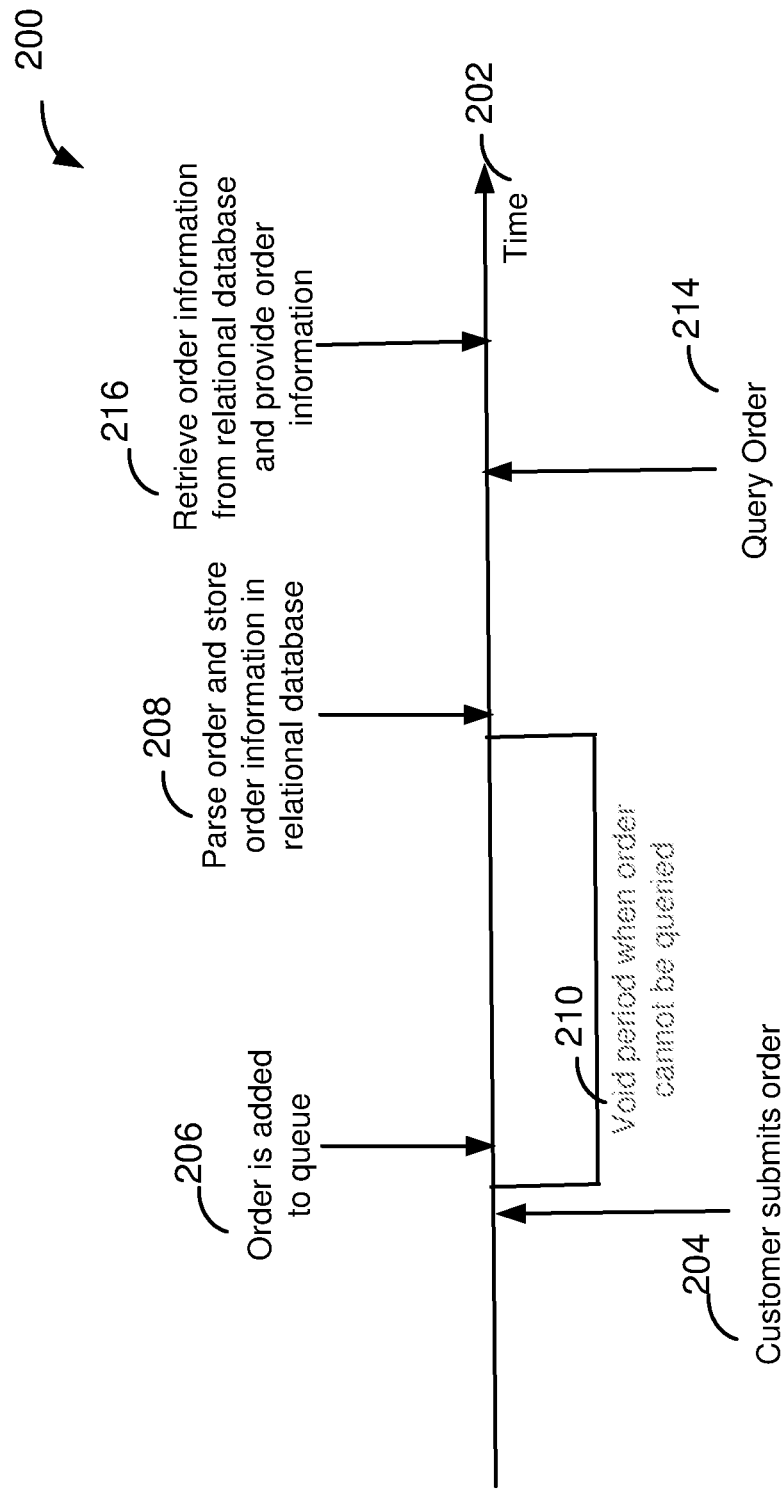
FIG. 2A shows an example of an order processing timeline 200 that illustrates drawbacks associated with conventional order processing systems.

To illustrate the problems present in existing order processing systems, an example order processing timeline is illustrated in FIG. 2A. FIG. 2A shows an example of an order processing timeline 200 that illustrates drawbacks associated with conventional order processing systems. Progression of time is represented by line 202. The operations illustrated below line 202 are performed by client devices, while the operations illustrated above the line 202 are performed by server(s).

As shown in FIG. 2A, when a customer submits an order (204), the order often cannot be processed immediately. Typically, the order is added to a queue (206), which is processed by one or more servers. Each entry in the queue can include the payload of a corresponding order. As the orders in the queue are processed, the server obtains the payload of the next order in the queue. The servers parse the payload of the order to obtain order information including a plurality of data items, perform validation processes on select data items, generate an order identifier, and store the order information in association with the order identifier in a relational database (208) after the order has been successfully validated. In addition, the order identifier may be transmitted to the customer to confirm that the order was successfully submitted.

Relational databases are typically used to store data such as order information since they provide efficient means of querying orders. However, writing to a traditional relational database is a time-consuming process and is taxing on the database CPU, which is a shared resource. Therefore, delays may impact multiple tenants supported by a multi-tenant database.

The processing of an order can be a time-consuming process. An order can include a significant number of data items. Moreover, relationships between various data items and the corresponding data model may be complex, further complicating the parsing and validation processes. Validation processes can also include various checks that are performed for a variety of purposes. For example, validation may be performed to ensure that the order is a valid order that has been received via the system rather than transmitted by a rogue entity. As another example, validation is commonly performed to verify that order items within the order are still available.

Order data is extremely sensitive and for the most part immutable. It is unacceptable to lose order values or store incorrect order values. Therefore, truncating the processing of an order is not an acceptable means for expediting order processing.

During periods of normal traffic, orders can generally be processed in a timely manner. However, during peak times such as Black Friday sales, large numbers of orders may be received during a short period of time. Under these circumstances, servers often cannot process orders in a timely manner, resulting in a time delay between the submission of the order (204) and the storing of the order information in the relational database (208). This results in a void period during which the customer has not received an order number and the order information cannot be queried (210).

In contrast, when the order is queried (214) after the order information has been stored in the relational database, the system will be able to retrieve the order information from the relational database and provide the order information (216) in response to the query. Therefore, a customer or customer service agent will be unable to access the order until the order information has been stored in relational database.

Figure 2B:
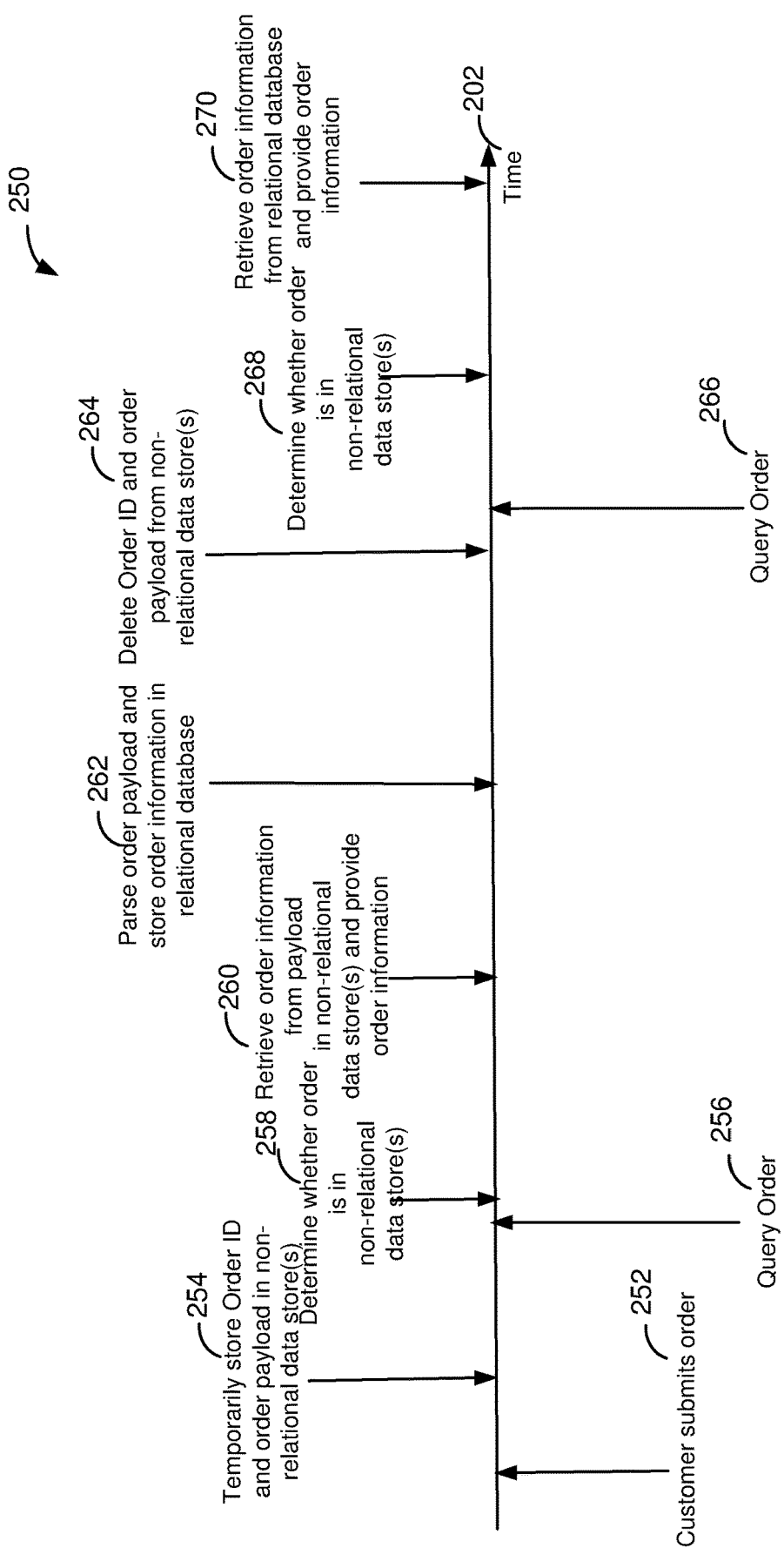
FIG. 2B shows an example of an order processing timeline 250 that illustrates the advantages of an improved order processing system, in accordance with some implementations.

To solve these problems, the order may be saved in association with an order identifier before processing of the order has been completed. FIG. 2B shows an example of an order processing timeline 250 that illustrates the advantages of an improved order processing system, in accordance with some implementations. Progression of time is represented by line 202. The operations illustrated below line 202 are performed by client devices, while the operations illustrated above the line 202 are performed by server(s).

As shown in FIG. 2B, when a customer submits an order (252), the order is processed by one or more servers. While a relational database enables data to be queried and retrieved efficiently, relational databases are inherently slow at writing data. As shown in FIG. 2B, the servers store the payload and a corresponding order identifier (ID) in a first data store that is not a relational database (254) before the processing of the order is completed. Since it is likely that only a small subset of order data will be accessed, the use of a non-relational data store provides a suitable solution to provide efficient access to order data. Moreover, writing data to a non-relational database is significantly faster than writing data to a traditional relational database. By storing the payload in a non-relational database, this enables quick read-only access to order information without waiting for heavy validation and database writes associated with a relational database. Therefore, it is possible to write data in a speed that is comparable to that at which the data is being received by the system.

In addition, the servers may perform minimal validation on the order. For example, the servers may verify that the order is a valid order before assigning an order ID to the order.

In some implementations, the order ID is also stored in a cache that maintains a list of orders for which data is stored in the first data store. When the order is subsequently queried by a customer or customer service agent, the servers may query the cache to determine whether the order remains stored in the first data store or whether the corresponding order information has been stored to its final destination after processing of the order has been completed.

When the customer or customer service agent queries the order ID (256), the servers determine whether the order ID in the first data store (258). Specifically, the servers may query the order ID in the first data store. Alternatively, the servers may query the cache to determine that the order is in the first data store. Upon determining that the order ID is in the first data store, the servers may retrieve the order information from the first data store and provide the order information (260) for presentation via a client device. For example, the servers may retrieve the payload from the first data store and provide the payload for display via a client device. As another example, the servers may retrieve the payload from the first data store and provide a subset of the data items of the payload. Reading data from a non-relational database is relatively fast. Therefore, the order may be efficiently and successfully queried even though the processing of the order has not been completed.

The servers proceed to complete processing the order by parsing the order payload to obtain order information and storing the order information in association with the order ID in a second data store that is a relational database (262). In addition, the servers may perform any validation processes that have not already been performed.

After the order information has been successfully stored in the second data store, the order can be removed from the first data store. Specifically, the servers may delete the order ID and payload from the first data store (264). Where the order ID has been stored in a cache, the order ID may also be deleted from the cache.

When the customer or customer service agent subsequently queries the order (266), the servers may determine whether the order is in the first data store (268). Upon querying the first data store or cache, the servers determine that the order information corresponding to the order ID is not in the first data store. The servers then retrieve the order information from the second data store and provide the order information (270). Therefore, the servers may retrieve the order from either of the two data stores so that the order is accessible at any time.

Order processing system 130 may have various system components and configurations. Two different implementations will be described in further detail below with reference to FIGS. 3 and 4.

Figure 3:
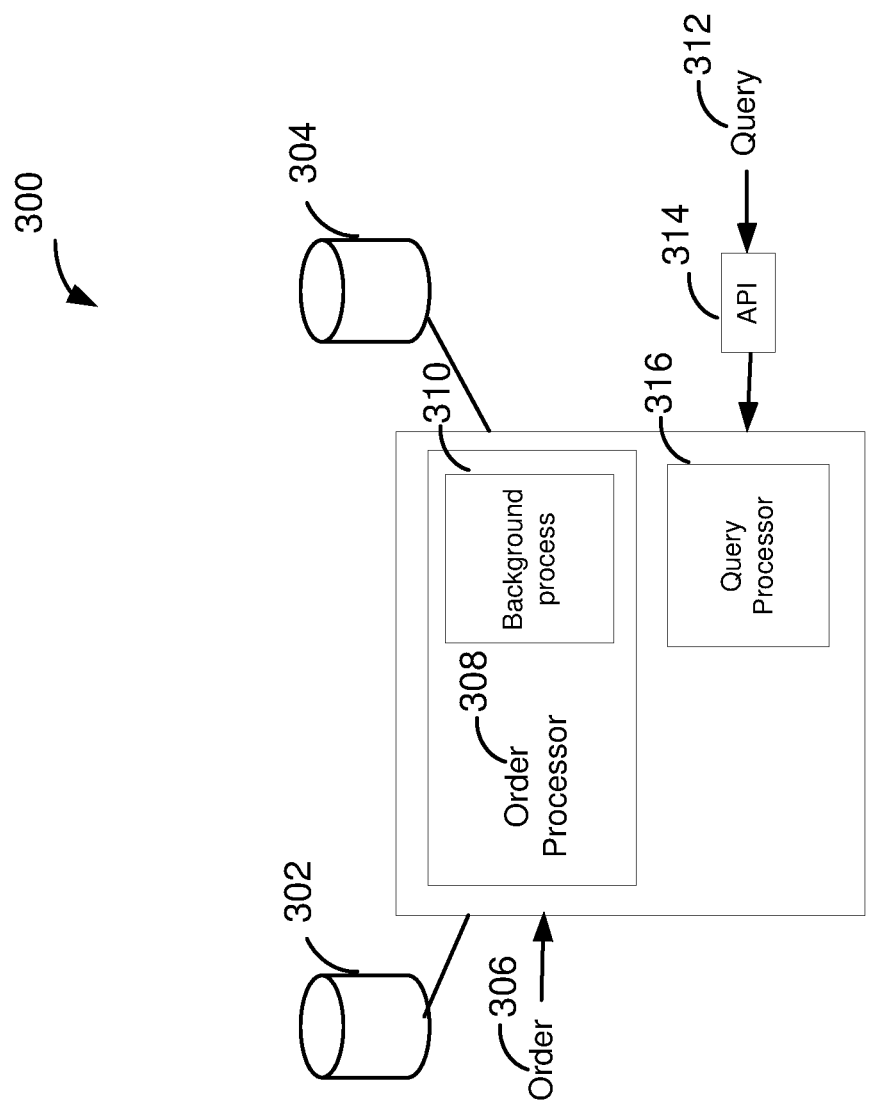
FIG. 3 shows an example of an order processing system 300 having a non-relational database and a relational database, in accordance with some implementations.

FIG. 3 shows an example of an order processing system 300 having a non-relational database and a relational database, in accordance with some implementations. As shown in this example, order processing system 300 includes a first data store 302 that is not a relational database and a second data store 304 that is a relational database. For example, first data store 302 may include an in-memory database. Data store 302 is highly available and maintains data in the event of a power failure. Data store 302 may include two or more data stores that provide redundancy, eliminating points of failure.

An order 306 that is submitted is processed by order processor 308. Order processor 308 can store minimally formatted order data associated with order 306 in association with an order ID in first data store 302. Subsequently, order processor 308 can retrieve order 306 from first data store 302 and parse order 306 to store order information and associated order ID in second data store 304. Order processor 308 can perform various validation processes, as described herein. In addition, order processor 308 can delete order 306 from first data store 302 after the corresponding order information has been stored in second data store 304.

In some implementations, background process 310 of order processor 308 processes orders in first data store 302 to store associated order information in second data store 304. In addition, background process 310 may delete order 306 from first data store 302 after corresponding order information has been stored in second data store 304.

When a query 312 is submitted for an order via an API 314, a query processor 316 may process query 312 including the order ID to provide the requested order information. For example, query processor 316 may query first data store 302 to determine whether the order associated with the order ID is in first data store. Query processor 316 accesses the order from first data store 302 if it has determined that an entry including the order ID is in first data store 302. Alternatively, query processor 316 accesses corresponding order information from second data store 304.

Figure 4:
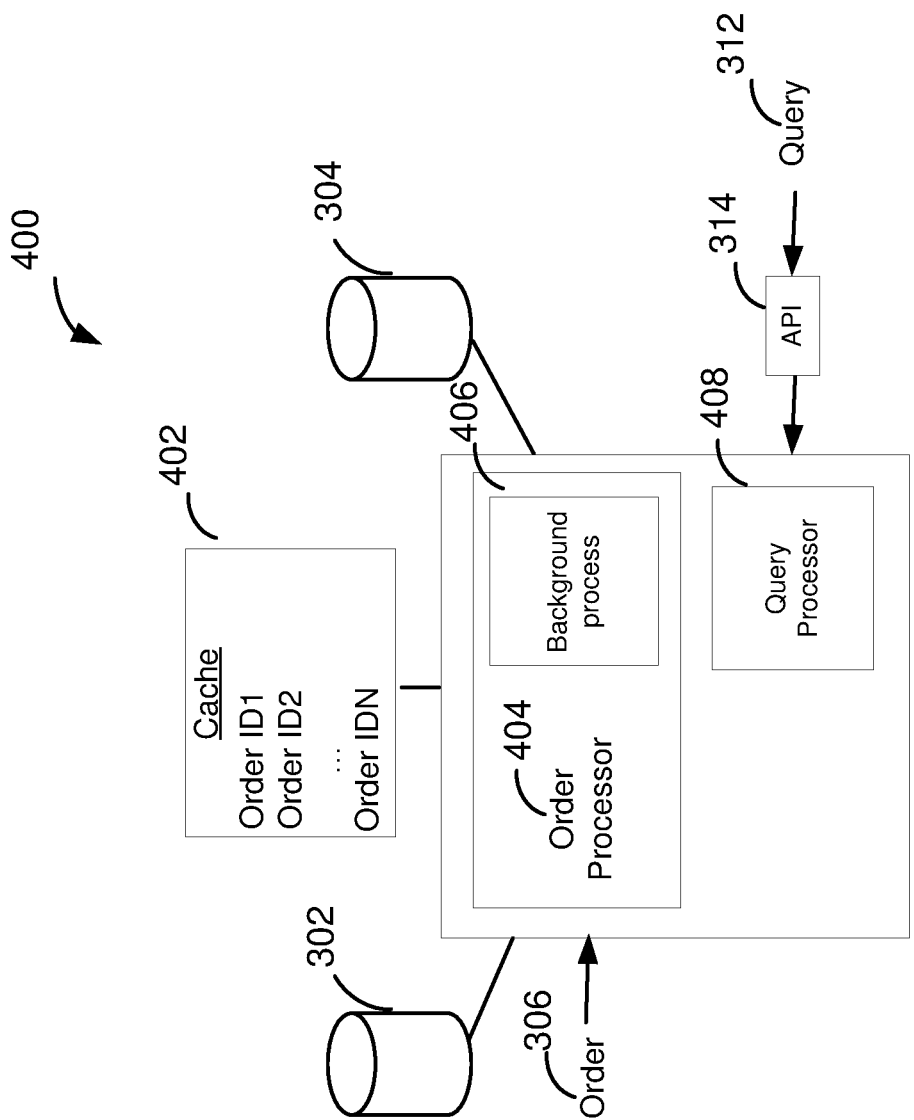
FIG. 4 shows an example of an order processing system 400 having a cache that stores order identifiers, in accordance with some implementations.

FIG. 4 shows an example of an order processing system 400 having a cache that stores order identifiers, in accordance with some implementations. As shown in this example, order processing system 400 includes a first data store 302 that is not a relational database, a second data store 304 that is a relational database, and a cache 402. An order 306 that is submitted is processed by order processor 404. Order processor 404 can store order 306 and associated order ID in first data store 302. In addition, order processor 404 can store the order ID in cache 402 to indicate that order information associated with the order is stored in first data store 402. Since the cache only stores order numbers, the cache can be smaller in size.

Subsequently, order processor 404 can retrieve order 306 from first data store 302 and parse order 306 to store order information and associated order ID in second data store 304. Order processor 404 can perform various validation processes, as described herein. After the order information has been stored in second data store 304, order processor 404 can delete order 306 from first data store 302 and the corresponding order ID from cache 402.

In some implementations, background process 406 of order processor 404 processes orders in first data store 302 to store associated order information in second data store 304. In addition, background process 406 may delete order 306 from first data store 302 and the corresponding order ID from cache 402 after corresponding order information has been stored in second data store 304. For example, deletion can include marking a corresponding entry as deleted.

When a query 312 including the order ID is submitted for an order via an API 314, a query processor 408 may process query 312 to provide the requested order information. For example, query processor 408 may query cache 402 for the order ID to determine whether the order is in first data store. Query processor 408 accesses the order from first data store 302 if the order ID is present in cache 402. Alternatively, query processor 408 accesses corresponding order information from second data store 304 if the order ID is not present in cache 402.

The complexity of order processing is due in large part to the complexity of the order that is submitted. An order may be defined by a data object that includes a plurality of data items. When an order is transmitted, the payload of the request can include various data items in a variety of configurations. Each data item may correspond to one or more fields. In some instances, a data item can include or reference additional data items. The relationship between data items within an order may be ascertained based upon the format of the order or associated data items.

FIG. 5 shows a simplified example of an order 500 that may be processed, in accordance with some implementations. In this example, the order is a Javascript Object Notation (JSON) request. However, this example is merely illustrative and an order may conform to other protocols or data formats. Therefore, a variety of types of data structures may be used to transmit an order.

An order can include one or more data items, which may each be defined by one or more fields and/or one or more additional data items. The relationship between data items can be complex. As a result, when an order is parsed, it is often desirable to temporarily store the order data items in a data structure such as a tree or graph according to a data model to facilitate the processing of the order.

As shown in this example, an order 500 can include data items such as a user account via which the order was submitted, a date that the order was submitted, status of the order, and a total amount for the order. An order may also include one or more delivery groups that each specifies a delivery addresses for a corresponding set of products within the order.

An order can identify one or more products or services, as well as a quantity for each product or service. In this example, products that are ordered include a quantity of one of a single order product identified by a corresponding product ID. An order can also include adjustments that correspond to the entire order or an individual product ID.

In this example, the order includes a single adjustment group associated with the product that includes adjustments that are made based upon a Summer Sale and a First Time Customer discount.

An order will also typically include tax information, which can be specified per product, as well as for the entire order. In this example, the order includes two different tax data items. A first tax data item is associated with the adjustment Summer Sale and specifies the amount of Summer Sale tax, while a second tax data item pertaining to Country Tax is associated with the product but not the adjustments. The order can also include the total amount of taxes associated with the order, as discussed above.

While this example illustrates a quantity of different fields, only a small subset of the possible fields that may be present in an order are shown. Therefore, an order may include numerous fields.

Moreover, some fields can involve a significant amount of processing based upon other fields or records. For example, a roll-up summary field may calculate a sum of amounts in related records or fields.

While a tree data structure is commonly used for many applications, order processing is complicated due to the complex relationships between data items of an order. For example, an adjustment may be connected to a product of an order, as well as an adjustment group of the order, enabling adjustments to be distributed among products. As another example, a roll-up summary field may be used to calculate a sum of amounts in related records or fields. This may be useful in summarizing child data items per product or per order, such as calculating total taxes associated with adjustments of an order, total adjustments for an order, total taxes for a specific product, and total taxes for an order. Furthermore, for an order having more than one delivery group, adjustments and taxes may vary based upon the corresponding locale. Therefore, there can be a significant amount of data to compute and validate for a single order.

To enable order data to be processed in an organized manner, order data may be temporarily stored in a graph data structure. Unfortunately, processing of a graph data structure can be time-consuming and consume a significant amount of CPU resources. This is particularly significant in a multi-tenant environment in which resources are shared. By storing the order in a non-relational database before completing processing of the order, the order may be made available without negatively impacting tenants of the database system. The order may subsequently be parsed, and any further validation and calculations may be performed prior to storing the order information in a relational database.

FIG. 6A shows an example of a data structure 600 that may be used to store order information in a non-relational database, in accordance with some implementations. As shown in this example, a data structure such as a table may store, for each order, an order ID and an order payload. Data structure 600 may be used as a temporary persistent store, as described herein.

In some implementations, data is partitioned based upon tenant ID. Thus, each order may be further associated with a corresponding tenant ID that is identified within the data structure. Alternatively, each tenant may be associated with its own dedicated data structure. In some implementations, the tenant ID is included in the primary key in both data structure 600 and corresponding relational database.

Order information associated with each order may be stored in a corresponding record in a relational database. Specifically, values associated with order items may be stored in fields of the record. Each order may be stored in fields of one or more tables of a relational database.

FIG. 6B shows an example of a data structure 650 that may be used to store order identifiers in a cache, in accordance with some implementations. As shown in this example, a cache may store order identifiers associated with those orders that are in data structure 600 of FIG. 6A. In some implementations, cache includes, for each order identifier, a corresponding tenant ID. In other implementations, the cache is dedicated for use with a specific tenant or organization.

Figure 7:
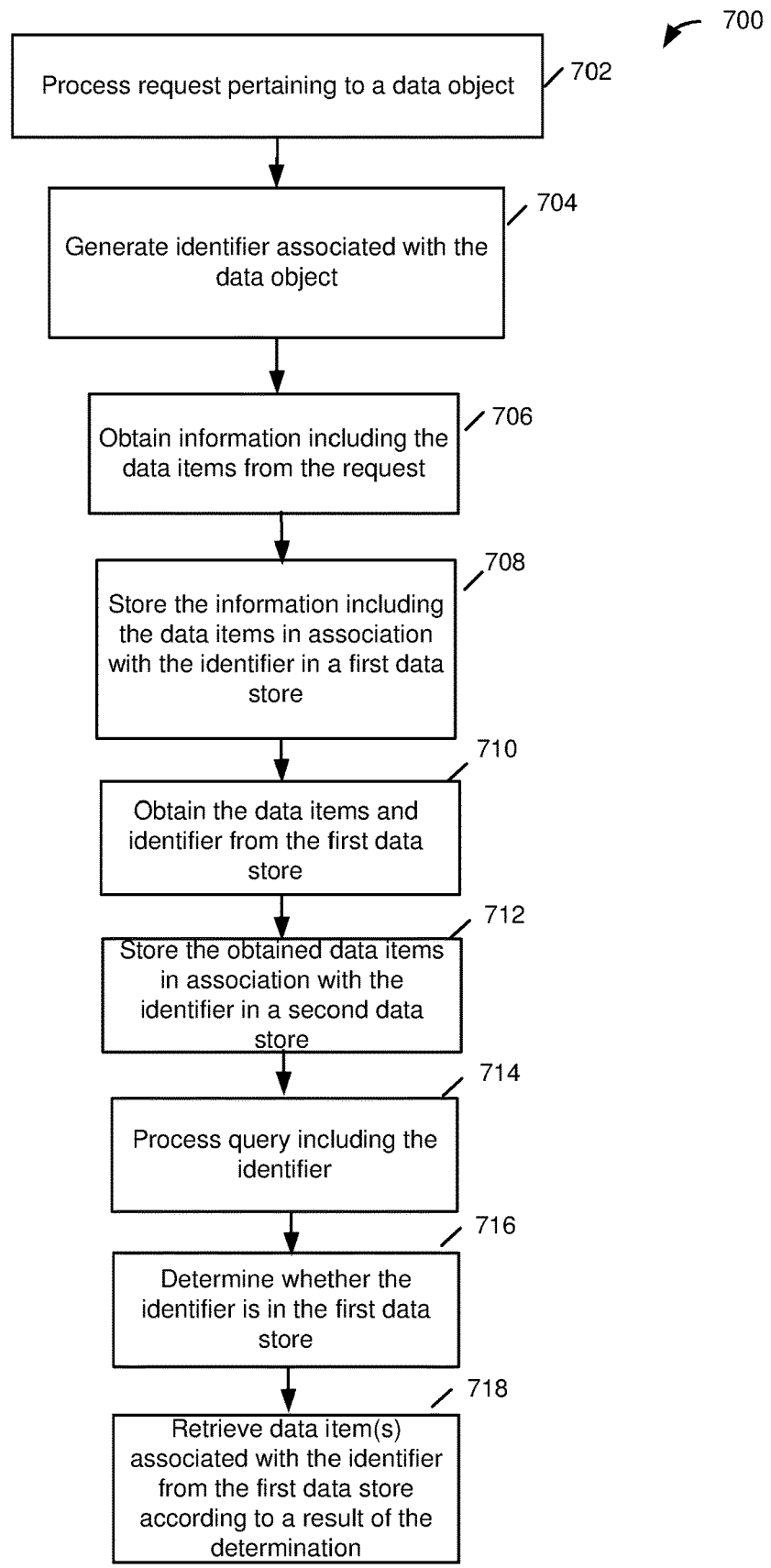
FIG. 7 shows an example of a method 700 for implementing order processing, in accordance with some implementations.

FIG. 7 shows an example of a method 700 for implementing order processing, in accordance with some implementations. The system processes a request received from a client device, where the request has a payload including a plurality of data items pertaining to a data object (702). In some implementations, the data object is an order. Requests may be received via an ingestion API.

In some implementations, the system performs one or more basic minimal validation processes on the payload. For example, the system may verify that the order is valid. Assuming that the validation processes are successful, the system may proceed with generating an identifier for the order.

The system generates an identifier associated with the data object (704) and obtains information including the data items from the request (706). In some implementations, the system obtains the information by obtaining the payload from the request.

The system stores the information including the data items in association with the identifier in a first data store (708), where the first data store is not a relational database. For example, the payload of the request may be stored without parsing the payload. This may include, for example, storing the payload in a text format such as long text or another human-readable format. Since the payload may be stored without significant processing, it may be stored and made accessible without significant delay. Thus, a customer or customer service agent may access a read-only view of the payload or data therein via a user interface.

In some implementations, a cache is implemented to maintain a record of data objects stored in the first data store but not yet stored in the second data store. Thus, the system may store the identifier in the cache The system may subsequently obtain the data items and identifier from the first data store (710). For example, the system may parse the payload stored in the first data store to obtain the data items from the payload. The system may complete processing of the payload by performing any further validation processes. Assuming that validation is successful, the system may store the obtained data items in association with the identifier in a second data store (712), where the second data store includes a relational database. The data items may be stored in an intermediate data structure according to a data model to facilitate the storing of the data items in the second data store. For example, data items of an order may be stored in a tree or graph data structure. In some implementations, the data items are obtained and stored in the second data store by a background process that processes entries in the first data store. More particularly, a scheduled job may fetch a batch of data from one or more entries of the first data store, parse the corresponding payload(s), and store the resulting order information in the second data store. For example, the scheduled job may pass the order information for one or more orders to an API that inserts the order information associated with the orders into the second data store.

After the data items have been successfully stored in association with the identifier in the second data store, the corresponding entry may be deleted from the first data store. Specifically, the information including the data items and corresponding identifier may be deleted from the first data store. In addition, where the identifier has also been stored in the cache, the identifier may be deleted from the cache.

In some implementations, a background process may delete both the payload and identifier from the first data store. Where a cache is implemented, the background process may delete the identifier from the cache. More particularly, a scheduled job may perform deletion or mark items in the first data store and/or cache to indicate that the items have been processed. The scheduled job may mark items or delete items according to time stamps, alphabetical order, or a time-to-live (TTL) field in entries of the first data store and/or cache.

Upon receiving a query including the identifier from a customer or customer service agent, the system may process the query to obtain the identifier (714). The system may then determine whether to retrieve order information from the first or second data store. In some implementations, the system determines whether the order information is in the first data store. Specifically, the system may determine whether the identifier obtained from the query is in the first data store (716). In some implementations, the system determines whether the identifier is in the first data store by querying the cache. If the identifier is in the cache, the system can conclude that the identifier and corresponding order information is in the first data store.

The system may then retrieve one or more of the data items associated with the identifier from the first data store according to a result of determining whether the identifier obtained from the query is in the first data store (718). Specifically, if the system has determined that the identifier is in the first data store, the system may use the identifier to retrieve or otherwise access the payload from the first data store. For example, the system may look up the identifier in the first data store. Alternatively, if the system has determined that the identifier is not in the first data store, the system may use the identifier to retrieve data item(s) associated with the identifier from the second data store. For example, the system may look up the identifier in the second data store.

In some implementations, an order may be modified or cancelled in a similar manner Specifically, if a request to modify or cancel an order is received prior to the transfer of the order information to the second data store, the system may modify or cancel the order in the first data store. For example, the system may modify the payload in the first data store, modify a status of the order within the payload to cancelled, or delete the order from the first data store. As another example, the system may enqueue more complex modifications so that they can be performed after the order information is saved in the second data store.

Through the above-described implementations, it is possible to access order data within a minute of receiving the order. This is achieved while respecting resource utilization. For example, CPU utilization of the relational database may be limited to 20 percent of CPU capability.

The above-described examples pertain to the processing of orders. However, the examples are merely illustrative and the disclosed implementations may similarly be used to ingest other types of data. Therefore, the disclosed implementations may facilitate access of various data objects during data ingestion in a variety of systems and contexts.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations.

In some but not all implementations, these various services can be provided in a cloud computing environment, for example, in the context of a multi-tenant database system. Thus, the disclosed techniques can be implemented without having to install software locally, that is, on computing devices of users interacting with services available through the cloud.

The term "multi-tenant database system" generally refers to those systems in which various elements of hardware and/or software of a database system may be shared by one or more customers. For example, a given application server may simultaneously process requests for a great number of customers, and a given database table may store rows of data such as order items for a potentially much greater number of customers.

Where there are multiple tenants, a user is typically associated with one or more tenants. For example, a user could be a salesperson of a company, which is a tenant of the database system that provides a database service. In the example of a multi-tenant database system, each organization or group within the organization can be a respective tenant of the system. In some but not all implementations, the disclosed methods, apparatus, systems, and computer program products may be configured or designed for use in a multi-tenant database environment.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created in association with an order. The record can have a data structure defined by the database service (a standard object). In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records. A record can also have a status.

Some non-limiting examples of systems, apparatus, and methods are described below for implementing database systems in conjunction with the disclosed techniques. Such implementations can provide for access of data objects such as orders in an order processing system.

Figure 8A:
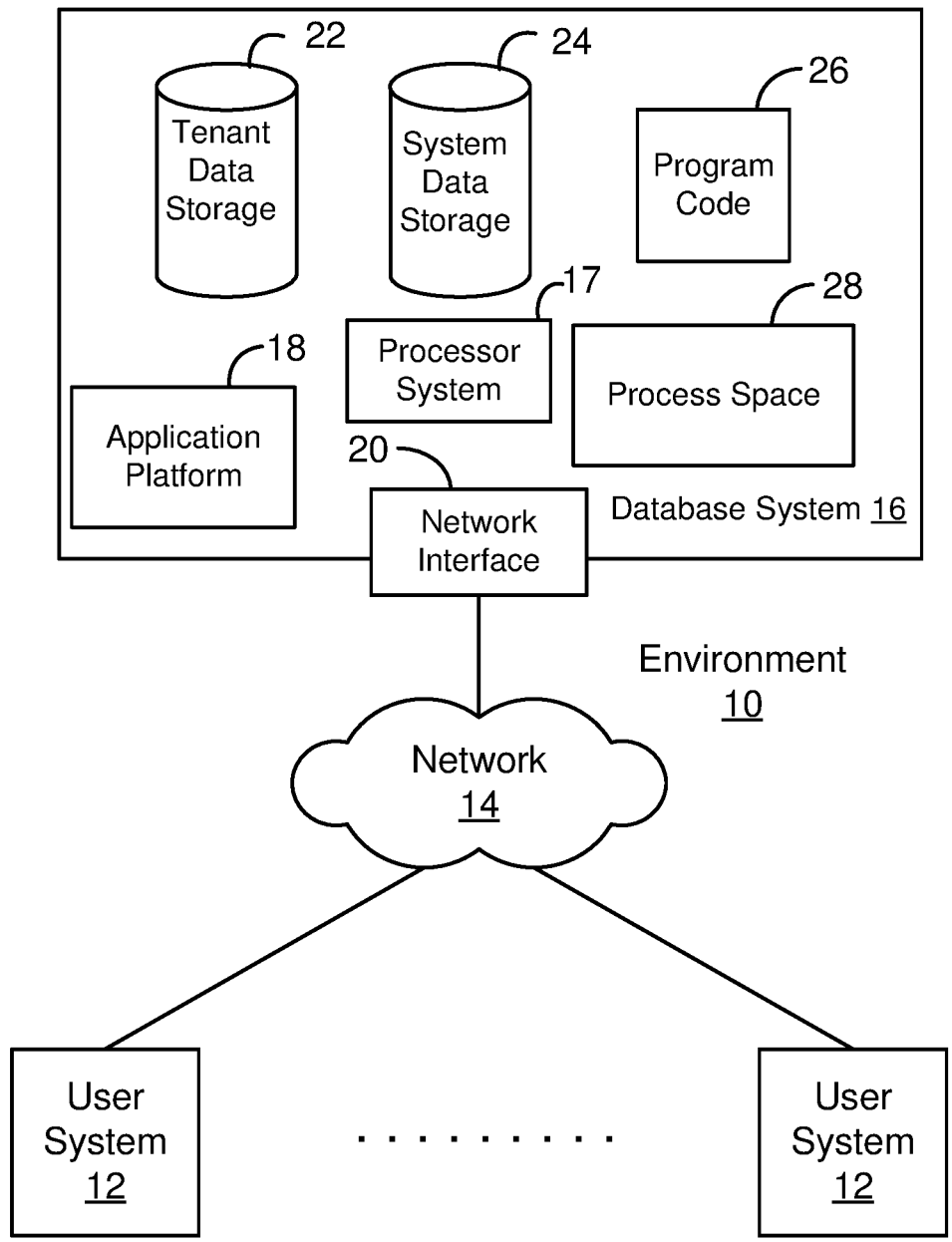
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
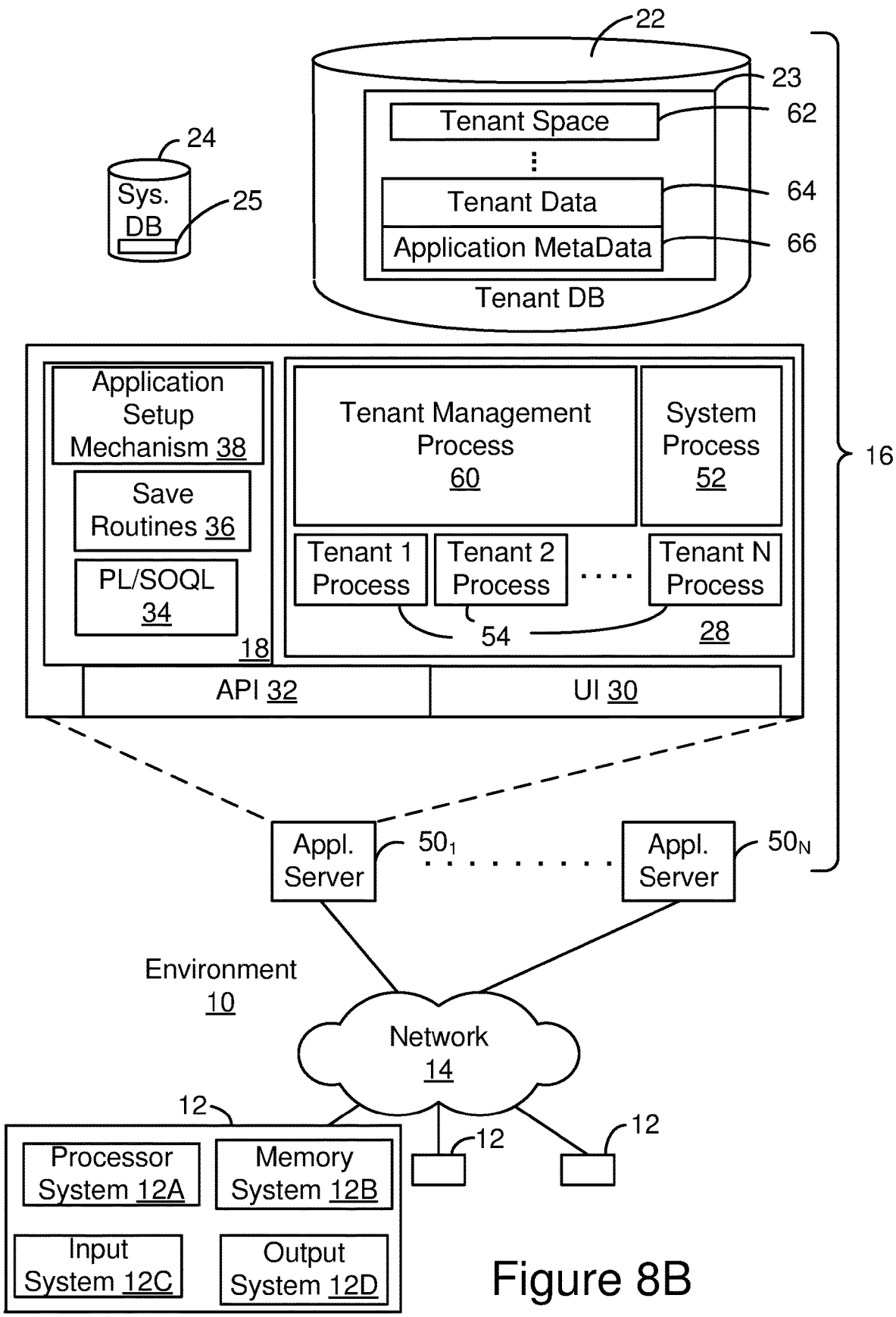
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
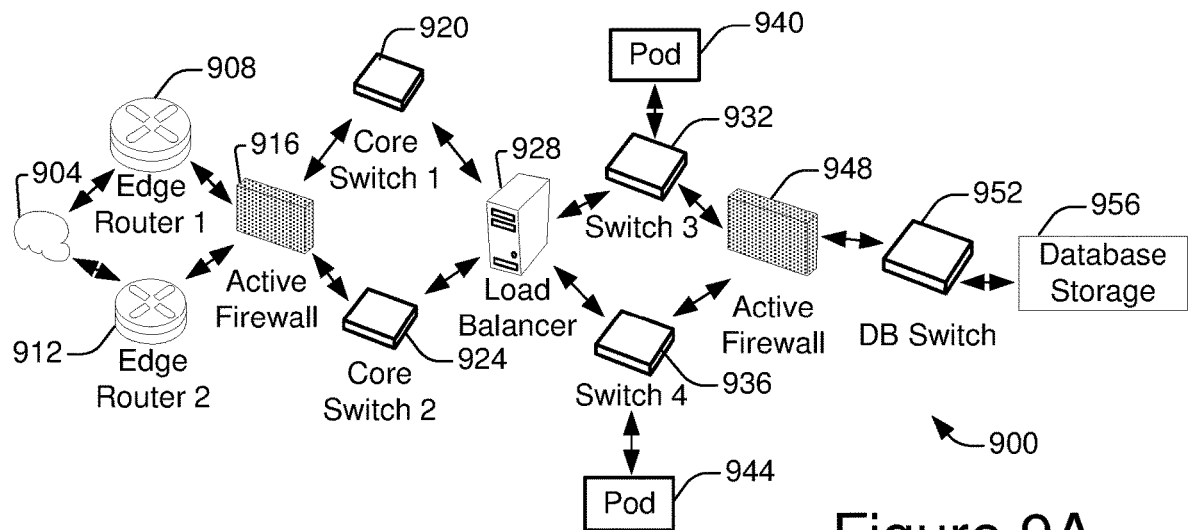
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
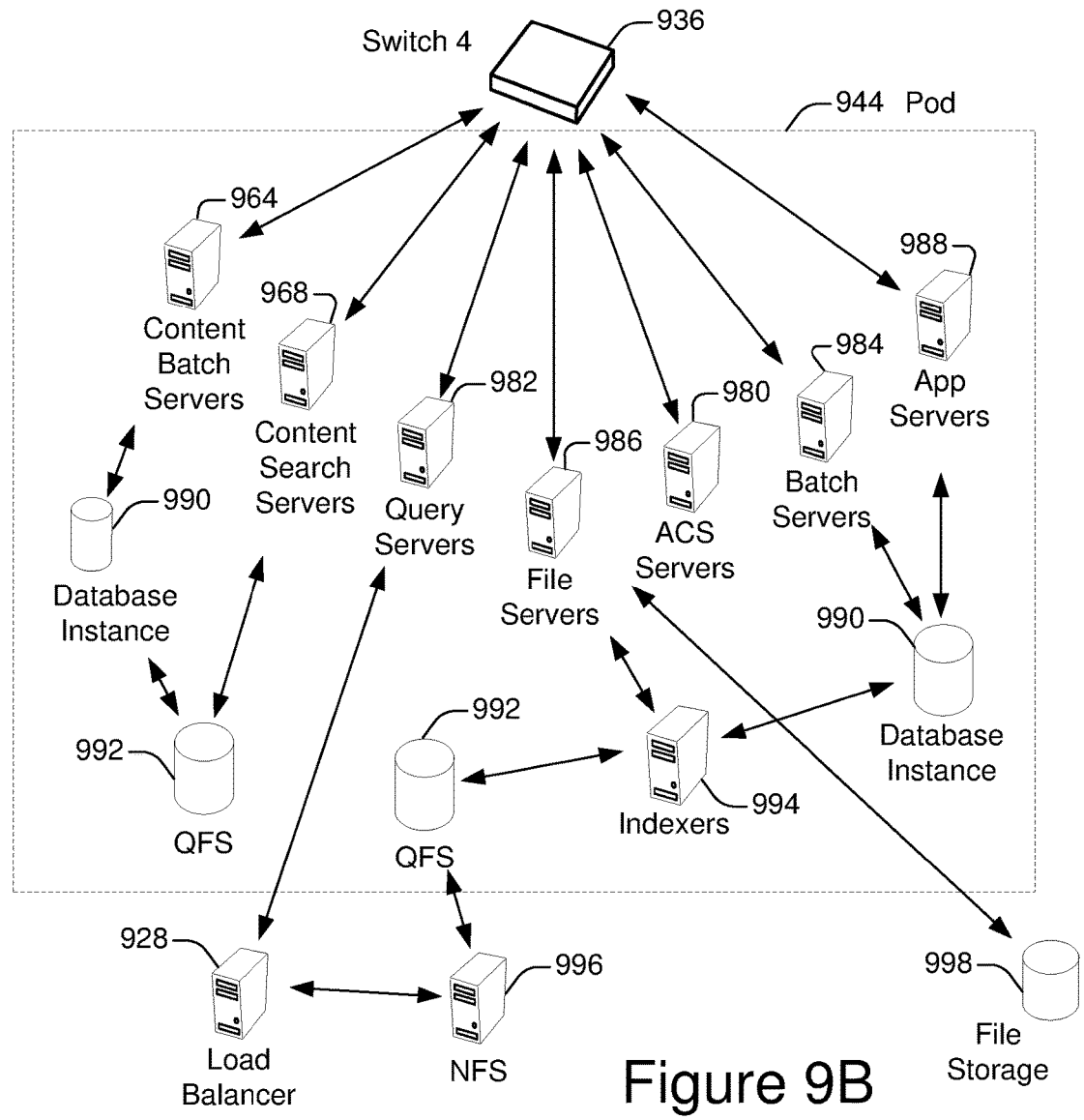
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system including one or more hardware processors, the one or more hardware processors configurable to cause:
processing a request received from a client device, the request having a payload including a plurality of data items pertaining to a data object;
generating an identifier associated with the data object;
obtaining information including the data items from the request;
designating the data items and the identifier for storage in a non-relational database and in a relational database;
storing the information including the data items in association with the identifier in a first data store, the first data store being the non-relational database;
obtaining the data items and the identifier from the first data store;
storing the obtained data items in association with the identifier in a second data store, the second data store being the relational database;
processing a query including the identifier to obtain the identifier from the query;
determining whether the identifier obtained from the query is stored in the first data store; and
retrieving one or more of the data items associated with the identifier from the first data store or the second data store according to a result of the determining whether the identifier obtained from the query is stored in the first data store.

2. The system as recited in claim 1, the one or more hardware processors further configurable to cause:
after storing the obtained data items in association with the identifier in the second data store, deleting the data items and the identifier from the first data store.

3. The system as recited in claim 2, wherein deleting the data items and the identifier from the first data store is performed by a background process.

4. The system as recited in claim 1, the one or more hardware processors further configurable to cause:
storing the identifier in a cache; and
after storing the obtained data items in association with the identifier in the second data store, deleting the identifier from the cache;
wherein determining whether the identifier obtained from the query is stored in the first data store includes ascertaining whether the identifier is stored in the cache.

5. The system as recited in claim 4, wherein deleting the identifier from the cache is performed by a background process.

6. The system as recited in claim 1, wherein:
storing the information includes storing the payload; and
obtaining the data items and the identifier from the first data store includes parsing the payload.

7. The system as recited in claim 1, wherein obtaining the data items and the identifier from the first data store and storing the obtained data items in association with the identifier in the second data store are performed by a background process.

8. A computer program product comprising a non-transitory computer-readable medium storing computer-readable program code capable of being executed by one or more processors, the program code comprising computer-readable instructions configurable to cause:
processing a request received from a client device, the request having a payload including a plurality of data items pertaining to a data object;
generating an identifier associated with the data object;
obtaining information including the data items from the request;
designating the data items and the identifier for storage in a non-relational database and in a relational database;
storing the information including the data items in association with the identifier in a first data store, the first data store being the non-relational database;
obtaining the data items and the identifier from the first data store;
storing the obtained data items in association with the identifier in a second data store, the second data store being the relational database;
processing a query including the identifier to obtain the identifier from the query;
determining whether the identifier obtained from the query is stored in the first data store; and
retrieving one or more of the data items associated with the identifier from the first data store or the second data store according to a result of the determining whether the identifier obtained from the query is stored in the first data store.

9. The computer program product as recited in claim 8, the program code comprising computer-readable instructions further configurable to cause:
after storing the obtained data items in association with the identifier in the second data store, deleting the data items and the identifier from the first data store.

10. The computer program product as recited in claim 9, wherein deleting the data items and the identifier from the first data store is performed by a background process.

11. The computer program product as recited in claim 8, the program code comprising computer-readable instructions further configurable to cause:
storing the identifier in a cache; and
after storing the obtained data items in association with the identifier in the second data store, deleting the identifier from the cache;
wherein determining whether the identifier obtained from the query is stored in the first data store includes ascertaining whether the identifier is stored in the cache.

12. The computer program product as recited in claim 11, wherein deleting the identifier from the cache is performed by a background process.

13. The computer program product as recited in claim 8, wherein:
storing the information includes storing the payload; and
obtaining the data items and the identifier from the first data store includes parsing the payload.

14. The computer program product as recited in claim 8, wherein obtaining the data items and the identifier from the first data store and storing the obtained data items in association with the identifier in the second data store are performed by a background process.

15. A method, comprising:
processing a request received from a client device, the request having a payload including a plurality of data items pertaining to a data object;
generating an identifier associated with the data object;
obtaining information including the data items from the request;
designating the data items and the identifier for storage in a non-relational database and in a relational database;

storing the information including the data items in association with the identifier in a first data store, the first data store being the non-relational database;

obtaining the data items and the identifier from the first data store;

storing the obtained data items in association with the identifier in a second data store, the second data store being the relational database;

processing a query including the identifier to obtain the identifier from the query;

determining whether the identifier obtained from the query is stored in the first data store; and retrieving one or more of the data items associated with the identifier from the first data store or the second data store according to a result of the determining whether the identifier obtained from the query is stored in the first data store.

16. The method as recited in claim 15, further comprising:

after storing the obtained data items in association with the identifier in the second data store, deleting the data items and the identifier from the first data store.

17. The method as recited in claim 16, wherein deleting the data items and the identifier from the first data store is performed by a background process.

18. The method as recited in claim 15, further comprising:

storing the identifier in a cache; and after storing the obtained data items in association with the identifier in the second data store, deleting the identifier from the cache;

wherein determining whether the identifier obtained from the query is stored in the first data store includes ascertaining whether the identifier is stored in the cache.

19. The method as recited in claim 18, wherein deleting the identifier from the cache is performed by a background process.

20. The method as recited in claim 15, wherein:

storing the information includes storing the payload; and obtaining the data items and the identifier from the first data store includes parsing the payload.

* * * * *